April 9, 1929.                D. H. SPICER                1,708,637
                              TIRE INFLATER
                         Filed June 27, 1927        2 Sheets-Sheet 2
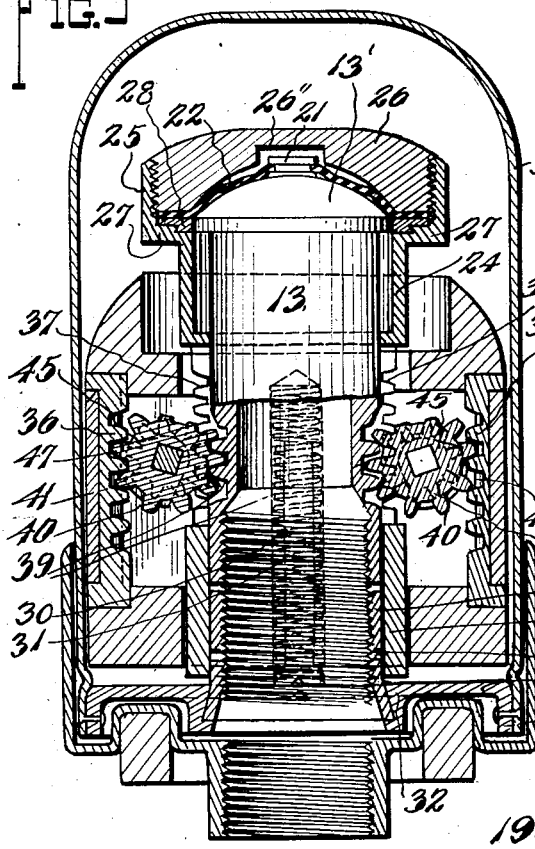
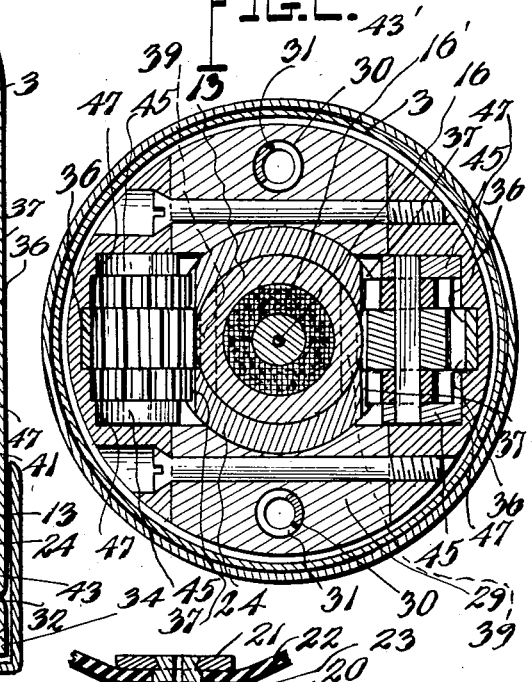
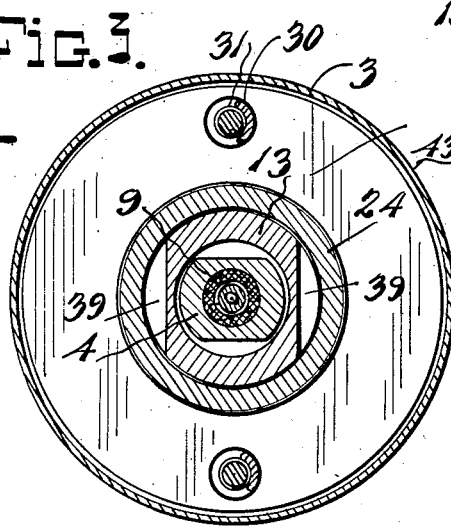
Inventor
D. H. Spicer
By Robb & Robb
Attorneys Patented Apr. 9, 1929.

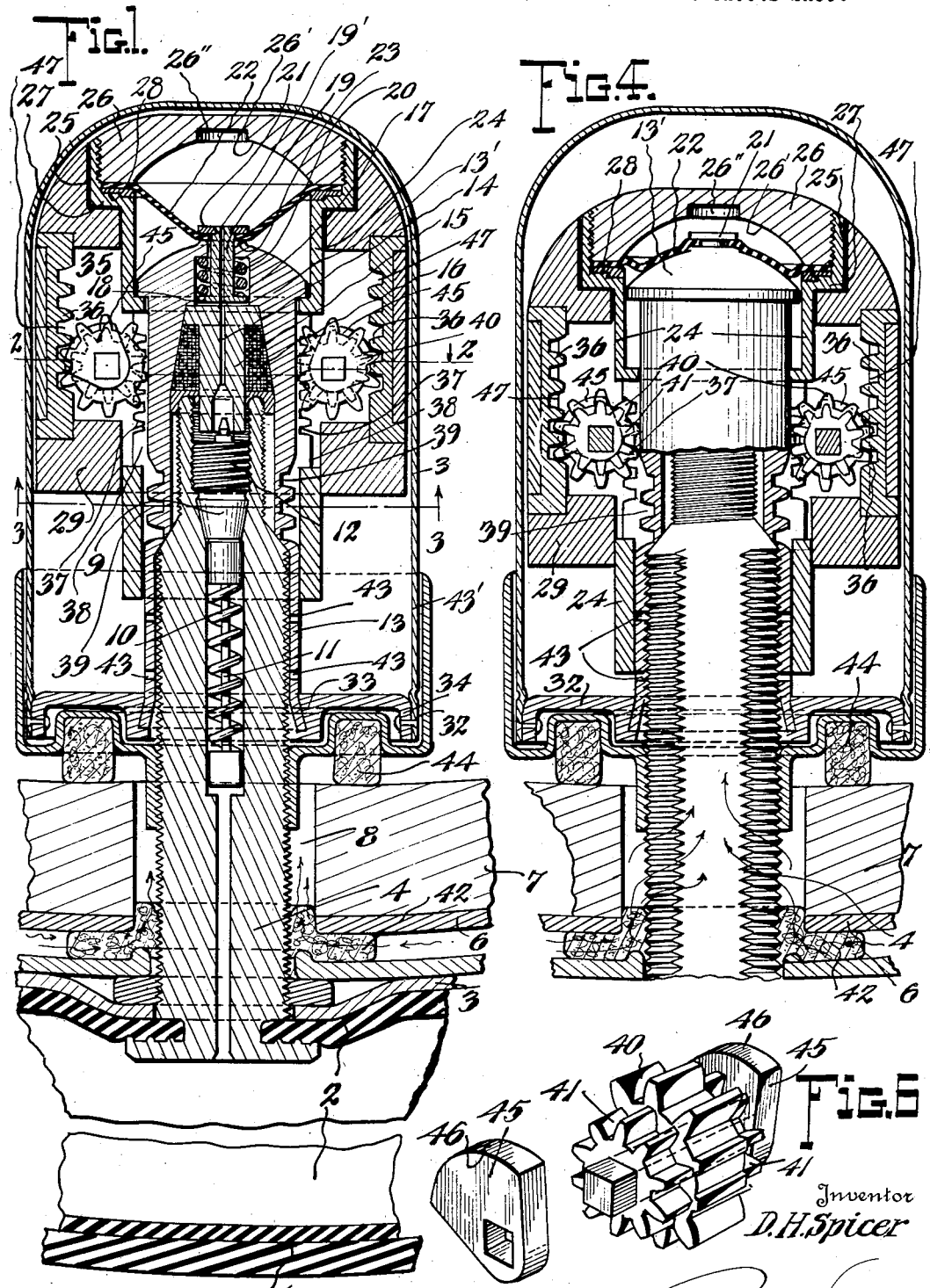

1,708,637

UNITED STATES PATENT OFFICE.

DELPHIN H. SPICER, OF LAKEWOOD, OHIO.

TIRE INFLATER.

Application filed June 27, 1927. Serial No. 201,927.

It is practically the universal experience that pneumatic tires, however well made and effective in use, are subject to slight leakage, so that the careful operator of an automobile finds it necessary periodically to reinflate to maintain air pressure at the requisite height.

The object of the present invention is to obviate such necessity by providing for such tires pump mechanism adapted to be conveniently attached to the valve stems of the tires and to supply air under pressure to such tires, as required.

The pump construction which forms the object of the invention of this application is embodied in and constitutes part of a pumping mechanism which will insure the effective delivery of air at the desired pressure, as needed, and the cessation of such delivery as soon as a standard or predetermined inflation has been obtained; it also constitutes part of a pumping mechanism which will operate automatically and which will embody means whereby the pump proper will be actuated effectively through centrifugal action.

In the accompanying drawings:—

Figure 1 is a longitudinal sectional view through the apparatus embodying the features of the present invention, a fragment of the felly, rim and tire being seen, and the parts being shown on a magnified scale;

Figure 2 is a transverse section on the planes indicated by the line 2—2 of Figure 1, looking in the direction indicated by the arrows;

Figure 3 is a similar section taken on the plane of line 3—3 of Figure 1 and looking in the direction indicated by the arrow;

Figure 4 is a detail section showing the preliminary travel of the cylinder from the position shown in Figure 1;

Figure 5 is a similar view showing the final movement of the weight and cylinder;

Figure 6 is a detail perspective of the actuating gears intermediate the weight and cylinder;

Figure 7 is a side elevation of the actuating gears showing the relation of the trunnion members; and Figure 8 is a detail section of the diaphragm valve.

Referring to the figures by numerals, 1 indicates the ordinary or conventional pneumatic tire, or shoe, in which is arranged the usual inner tube 2 having the valve stem spreader 3, and valve stem 4. The tire is mounted on the usual demountable rim 5, which in turn is mounted on the fixed rim or felly band 6 carried by the felly 7. The fixed rim 6 and felly 7 are apertured at 8 for the passage of valve stem 4. The valve stem 4 also is provided with the well known conventional check valve 9 which, with its control spring 10, stem 11 and retaining nut 12, is commonly referred to as a valve "insides." The parts thus far mentioned are all well known and extensively in use. A sealing cap is commonly mounted on the extremity of the stem 4 to supplement resistance to the escape of air under pressure, and a dust-guard or cover cap is threaded over the whole stem structure in common use, but when the present invention is utilized, the dust-cap and sealing cap are omitted.

A tubular stationary piston 13 is threaded to and extends beyond the stem 4 and is provided with a packing gland 15 bored axially at 14 and arranged to communicate with the port of stem 4. The packing gland 15 is appropriately flanged and surrounded by a gasket or like packing 16 to seal the communication of the valve stem port with the piston 13. Beyond the gland 15, the piston 13 is provided with a reduced bore or axially extending recess 17 in which are arranged the flanged head 18 and a part of the body 19 of a check valve. The body 19 is cylindrical and surrounded by a coiled spring 20 tensioned to stress the check valve radially outward. The inner end of the body 19 is surrounded by an annulus 21, preferably swaged or otherwise anchored to the body 19 of the check valve to provide an inner head. Since the tire 1 is outward of the wheel construction and the other parts extend inward toward the axis of rotation, parts will be referred to as inward or outward, according to their relative radial location with respect to the wheel on which they are mounted. A flexible elastic diaphragm 22, preferably india rubber, snugly surrounds the body 19 of the check valve in contact with the outer face of the head 21 in position for being stressed by the spring 20 so as to hold the portion of the diaphragm surrounding the stem or body 19 against an annular seat 23 in the form of a ridge extending inward from the inner extremity of the piston 13 about the bore of said piston through which the body 19 of the check valve extends.

A cylinder 24 slidingly surrounds the piston 13 and is adapted to reciprocate relative thereto to provide a guide therefor, the cylinder 24 snugly enclosing the cylindrical part of the piston 13 and extending beyond the same. The cylinder 24 is of uniform diameter, equal substantially to the diameter of the cylindrical portion of the piston 13 for the greater part of its length and terminates at its inner extremity in an annular off-set or enlarged portion 25 into which is seated by threading or other appropriate anchorage means, a beading nut or cap 26 forming a cylinder head. The enlarged portion 25 produces the outstanding annular shoulder 27 which is lined by a packing gasket 28, and between the gasket 28 and the inner face of nut 26 extend the margins of the diaphragm 22, so as to be clamped in place when head 26 is seated in operative position. Inner terminus of piston 13 is preferably formed parti-globular as seen at 13'. The face of head 26 exposed toward the piston 13 is provided with a parti-globular concavity 26' corresponding in dimensions and contour approximately to those of the convexity 13' so that when the inner terminus of one member engages the outer terminus of the other they approximately fit, the diaphragm 22 being, of course, interposed between and conforming to the contour of the parts engaged incident to its flexibility. A pocket 26'' is formed in the head 26 opening into the concavity 26' to accommodate the flange 21 and corresponding part of the body of the check valve 19, when the piston and cylinder head are in position of perfect contact, or as nearly perfect as is attainable. Thus, a cavity or chamber is provided between the inner face of the diaphragm 22 and the surface of the head 26 whenever the piston and cylinder are moved relatively apart and whenever the cylinder and piston are brought together, air within said cavity or chamber is compressed and when sufficiently compressed is forced along the port 19' formed in the check valve 19, along the port 14 and outward past the valve 9 and into the inner tube 2. Since air is admitted between the diaphragm 22 and the check valve seat 23 into space about the check valve 19 and thence through port 19' into said space or chamber when check valve 19 is released from a firm seating upon bead 23, it will be seen that by relative reciprocation of piston 13 and cylinder 24, successive charges of compressed air may be injected into the inner tube 2 until such relative movement is stopped.

It will also be apparent that when the pressure within the tire reaches the point of equilibrium relative to attainable pressure in the chamber between diaphragm 22 and nut 26, further injection of air will not occur.

It will further be noted that when the diaphragm is expanded as in Figure 5, there is a trapped body of air between it and the cylinder head and in the opposite movement of the diaphragm this air is expanded, with a consequent reduction of its pressure which is restored to atmospheric pressure by the admission of air through the diaphragm valve. When the pressure of the expanded air between the diaphragm and head equals that of the atmosphere further feed to the tire is prevented even though the pump continues operation.

As a means to effect requisite relative reciprocation of the parts as above indicated, a sliding weight 29 surrounds the cylinder 24 and is free to reciprocate relative thereto, its movements being radial with respect to the axis of rotation of the wheel structure of which valve stem 4 is a part. The weight 29 is provided with two recesses 30 at diametrically opposite points in which fit the coiled springs 31 which extend from the weight 29 outward and might be permitted to engage the felly 7, but for effectiveness and completeness of organized structure, a retaining plate is preferably provided for being engaged by the springs 31 which retaining plate consists of an annulus 32 having radially extending inner and outer flanges 33 and 34. The flange 33 may be shrunk on the outer extremity of the skirt of piston 13 or otherwise anchored thereto as by a driven fit. The weight 29 is provided with a pair of diametrically oppositely arranged longitudinal slots 35, each being formed with a rack 36 facing toward the cylinder 24. The cylinder 24 is provided with a pair of racks 37 for each rack 36, each rack 37 facing in the opposite direction or toward the respective recess 35, the teeth of each rack 37 being of reduced dimensions relative to the teeth 36. The cylinder 24 is provided with a longitudinal slot 38 between each pair of racks 37 for permitting the passage of the teeth of the spur gear, hereinafter mentioned. Piston 13, approximately midway of the length of its skirt is provided with a toothed rack 39 corresponding in dimension of teeth to the dimensions of the teeth of racks 36, there being one rack 39 for each rack 36 located outward of the racks 37.

Arranged within each recess 35 is a preferably integral differential gear including a main mutilated pinion 40 disposed to have its teeth meshing with the rack 36 and its flat or mutilated face slidingly engaging the adjacent smooth surface of piston 13. At each side of each pinion 40 and preferably formed integral therewith and completing the differential gear, are pinions 41 of reduced diameter relative to pinion 40, dimensioned to engage the teeth of the respective racks 37, 37.

In operation, the parts being mounted as described, shocks and jars will effect reciprocation of the cylinder 24 relative to piston 13 or shocks and jars plus centrifugal force will accomplish such action, or variations in centrifugal force incident to changes in the speed of rotation of the tire 1 will accomplish such action. Thus, if the springs 31 are tensioned to resist radial outward movement of weight 29 under the centrifugal force incident to that speed of rotation attained say when the vehicle to which the wheel is applied has acquired a speed of fifteen miles an hour, the weight 29 will remain substantially stationary, except for movements incident to shocks and jars, until the speed of vehicle passes the speed limit mentioned. The weight 29 will then begin to travel outwardly under centrifugal force, the speed and extent of travel being exactly proportional to the rate of acceleration and speed of rotation attained by the wheel to which tire 1 is applied. If the requisite speed is attained, the weight 29 will make a full stroke. In making this stroke, the first part of the movement occurs while the pinion or spur 40 is in mesh with the rack 36 and the pinions 41 are in mesh with the racks 37. Hence, during the first part of the outward stroke of weight 29, cylinder 24 moves outward with the weight so that the movement of the diaphragm 22, under the lower resistances of less compressed air, will occur readily and quickly but when the gears 40 reach the place of the first notch of the racks 39, the outermost tooth contacting with piston 13 will enter such recess and the said gear will walk along the respective rack 39. This walking movement causes such angular advance or partial rotation of the gears 41 as to compensate in part for the outward travel of the differential gears, so that the cylinder 24 can not move outwardly at the same rate as the weight 29 but only at a rate incident to the ratio of the gears. The leverage afforded the weight 29 in distributing its stress to the cylinder 24 may thus be rendered amply high to insure a stroke of the piston against any required compression of the air in the chamber bounded by the diaphragm 22 and the outer face of nut 26.

Under the spring tension proposed the weight is supported at substantially normal position and no pumping occurs until the speed reaches approximately fifteen miles per hour, except the movement of the weight due to vibration or road jars causing a shifting action thereof. When the speed is increased above fifteen miles per hour the weight initiates a radial centrifugal movement and owing to the relation of its master gear with the wall of the piston slides thereon and carries the cylinder at a speed uniform with the weight travel. During this sliding movement of the weight upon the fixed piston the teeth of its master gear reaches the rack portion upon the piston and by engagement therewith causes a revolution of the gear which through the differential gearing transmits a retarded movement to the cylinder which, due to the increased leverage, imparts additional power for the final compressive action.

It has been found impracticable to provide the piston and cylinder with the usual packing rings, as under slow pumping action the escape of air past such rings prevents a maintenance of the desired pressure. To avoid such leakage I use the sealed diaphragm which provides an expansible compression chamber at the cylinder head to retain the desired pressure without leakage. This pressure at the seat 23 forms a secondary seal for the usual valve in the stem.

To prevent the gears 40 from meshing too tightly with the teeth of the rack 36, trunnions 45 are provided. These trunnions, of the shape shown in Figure 5, are located on each side of the gears 41. One surface of the trunnions is a section of a cylinder, as at 46, and is adapted to roll on the plane surfaces 47 in the recesses 35. This trunnion structure reduces the friction used in operating the gears to a very large extent affording a highly efficient operation thereof.

In operation, air is admitted preferably through a filter 42 constructed in the form of an annulus disposed between the fixed rim 6 and the demountable rim 7, and surrounds the valve 4 and proportioned to transversely fill the opening 8. Air is drawn in between the fixed and demountable rims and is thus kept free from dust and other foreign articles and passes up along the threads between the stem 4 and outer portion of the skirt of piston 13. A lateral port 43, or a series of such ports, is provided through said skirt of piston 13 to allow the air to enter the space between weight 29 and the sleeve of the cylinder from which it moves inward through the slots 38 and along the cylindrical walls of the piston 13 to a point between the parti-globular terminus of piston 13 and the outer face of diaphragm 22. Air is drawn to this position incident to the return movement of the cylinder 24 and the weight 29, and due to the fact that air is by such movement also drawn past the check valve seat 23 and into the compression chamber as previously described. To prevent access of foreign matter to the mechanism and otherwise protect it, a housing or shell 51 encloses the same, and is fixed to the annular flange 34 as by a driven fit or otherwise. An appropriate cushioning gasket 44 is preferably interposed between the outer face of annulus 32 and the adjacent face of the felly 7 so that the parts may be threaded firmly home along the valve stem 4 without injury to any engaged parts, the cushion 44 seating itself against the felly.

The ratio of the gearing illustrated in the drawing is such that after the gears 40 begin to walk in the racks 39, the advance or compressing movement of the cylinder 24 is substantially one-sixth that of the movement of the weight 29, but of course, the gear ratios may be varied to any extent found desirable in any particular instance, and the leverage increased or decreased as found preferable.

Also other changes may be made in the proportions, construction and operation of parts without departing from the spirit and scope of the invention and well within the protective force and intent of the appended claims.

Having thus described my invention, what I claim as new and desire to secure by Letters Patent of the United States, is:—

1. A tire inflater comprising a piston, a cylinder mounted thereon, a diaphragm disposed at the head of said cylinder to form a compression chamber, and a valve device mounted upon the piston and communicating with said compression chamber to admit air thereto in one position and to prevent such admission and communicate with a tire member when in another position.

2. An inflater of the class described comprising a cylinder having a head, a piston in said cylinder, a diaphragm extending across said cylinder between the head and the piston and having a central opening, and valve means located in the piston and cooperating with the diaphragm to connect the latter to the piston, said valve means being operable to release the diaphragm from engagement with the piston whereby air is permitted to enter the compression chamber on separation of the head and piston.

3. An inflater of the class described comprising a cylinder having a head, a piston in said cylinder, a diaphragm extending across said cylinder between the head and the piston and having a central opening, a valve member connected to said diaphragm through said opening, said valve member having a portion extending into the piston, and spring means associated with the valve member for normally retaining the diaphragm seated against the piston, said means being operable by separation of the head and piston to release the diaphragm from the piston.

4. An inflater for pneumatic tires of the class described, comprising, in combination, a head member formed with a concave recess therein, a diaphragm having its peripheral edge fastened to the head member and having a central opening, said diaphragm and recessed head member defining a compression chamber, a hollow piston having a surface complemental to the recessed surface of the head, valve means connecting the central portion of the diaphragm to said piston, the head and piston being relatively movable to vary the capacity of the compression chamber, the valve means aforesaid consisting of a valve member having a bore, said valve member also having a head connected to the diaphragm and a flange spaced from said head, and a spring cooperating with the last mentioned head and the plunger and normally maintaining the diaphragm and piston in a sealed relation, the valve member being operable incidental to the expansion of the compression chamber to break the seal between the diaphragm and piston to admit air into the chamber.

5. An inflater for pneumatic tires of the class described, comprising a piston, a cylinder surrounding the piston and provided with a head, a diaphragm extending across the cylinder between the head and the piston and connected to the piston, said head and piston being relatively movable to vary the capacity of the compression chamber formed between the head and the diaphragm, and valve means at the point of connection between the piston and the diaphragm for admitting air to the compression chamber.

6. An inflater for pneumatic tires comprising a piston, a cylinder surrounding the piston and provided with a head, a diaphragm extending across said cylinder between the head and the piston and providing a compression chamber with the head, and a check valve reciprocably mounted in said piston and extending through and connected to said diaphragm and adapted to control the supply of air to said compression chamber.

7. An inflater for pneumatic tires comprising a piston, a cylinder surrounding the piston and provided with a head, a diaphragm extending across said cylinder between the head and the piston and providing a compression chamber with the head, and a check valve reciprocably mounted in said piston and extending through and connected to said diaphragm and having a port for the supply of air to and from said compression chamber.

8. An inflater for pneumatic tires comprising a piston, a cylinder surrounding the piston and provided with a head, a diaphragm extending across the said cylinder between the head thereof and the piston, the piston having a bore extending through the end thereof which is presented toward said head, and a check valve reciprocably mounted in said bore and extending through the diaphragm and secured thereto, the said valve being provided with a port arranged to communicate with the space between the diaphragm and the piston on separation of the piston and the cylinder head and to be closed by approaching movements of the piston and cylinder head.

9. An inflater for pneumatic tires comprising a piston, a cylinder surrounding the piston and provided with a head, a diaphragm extending across the said cylinder between the head thereof and the piston, the piston having a centrally arranged bore extending through the end thereof which is presented toward said head, a check valve reciprocably mounted in said bore and extending through the diaphragm and secured thereto, and a spring in said bore resisting the outward movement of the said valve, the said valve being provided with a port arranged to communicate with the space between the diaphragm and the plunger as the cylinder head and the piston are separated and to be closed as the piston and cylinder head approach each other.

10. An inflater for pneumatic tires comprising a piston, a cylinder surrounding the piston and having a head, a diaphragm extending across the cylinder between the said head and piston, the piston having a bore opening toward the said head, a check valve reciprocably mounted in said chamber and having a head within the compression chamber engaging the diaphragm and a stem extending through said diaphragm and reciprocably mounted in the bore of the piston, and a spring tending to press the diaphragm into engagement with the portion of the piston surrounding said bore, the said valve being provided with a port communicating at one end with the compression chamber and arranged to communicate at its opposite end with the space between the piston and the diaphragm when the seal between the diaphragm and the piston is broken.

11. An inflater for pneumatic tires comprising a piston, a cylinder surrounding the piston and provided with a head, a diaphragm extending across the said cylinder between the head and the piston and forming a compression chamber with said head, and a valve reciprocably mounted in said piston for admitting air to said chamber, the said valve extending through the said diaphragm and being connected thereto and serving to form a seal between the diaphragm and the piston during the compression stroke of the parts.

12. An inflater for pneumatic tires comprising a piston, a cylinder surrounding the piston and provided with a head, a diaphragm extending across the said cylinder between the head and the piston and forming a compression chamber with said head, a valve reciprocably mounted in said piston and having a port therethrough for admitting air to and from said chamber, the said valve having a head within the compression chamber secured to the diaphragm, and a spring tending to move the said valve in a direction to press the diaphragm beneath the valve head into engagement with the piston, there being a passage in said piston for supplying air to said valve port, the said passage being so located as to be sealed by the portion of the diaphragm between the said head and the piston when the diaphragm and cylinder head are separated.

13. An inflater for pneumatic tires comprising a piston, a cylinder surrounding the piston and provided with a head, a diaphragm extending across the said cylinder between the head and the piston and forming a compression chamber with said head, a valve reciprocably mounted in said piston and having a head arranged within and secured to the diaphragm and a stem extending through said diaphragm and into said piston, and a spring tending to force said valve away from the cylinder head and adapted to press the portion of the diaphragm surrounding the said stem against the piston, thereby to provide a seal as the diaphragm and cylinder head approach each other, the said valve being provided with a port arranged to communicate with the space between the diaphragm and the piston when the piston and the cylinder head separate and the said seal is broken thereby to supply air to the said compression chamber.

In testimony whereof I affix my signature.

DELPHIN H. SPICER.